United States Patent
Wang et al.

(10) Patent No.: US 9,565,516 B2
(45) Date of Patent: *Feb. 7, 2017

(54) RATE INDICATION AND LINK ADAPTATION FOR LONG RANGE WIRELESS NETWORKS

(71) Applicant: MEDIATEK INC., Hsinchu (TW)

(72) Inventors: James June-Ming Wang, San Marino, CA (US); Kai-Chun Chou, Taipei (TW); Li-Chun Ko, Taipei (TW); Ching-Hwa Yu, Tainan (TW); YungPing Hsu, Taipei (TW); Chih-Shi Yee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,108

(22) Filed: Sep. 8, 2015

(65) Prior Publication Data

US 2016/0073220 A1 Mar. 10, 2016

Related U.S. Application Data

(60) Provisional application No. 62/047,706, filed on Sep. 9, 2014, provisional application No. 62/052,519, filed on Sep. 19, 2014.

(51) Int. Cl.
*H04W 4/00* (2009.01)
*H04W 28/22* (2009.01)
(Continued)

(52) U.S. Cl.
CPC .............. *H04W 4/008* (2013.01); *H04L 47/26* (2013.01); *H04W 28/0236* (2013.01); *H04W 28/22* (2013.01)

(58) Field of Classification Search
CPC .................................................. H04W 4/008
See application file for complete search history.

(56) References Cited

U.S. PATENT DOCUMENTS

5,706,428 A * 1/1998 Boer ..................... H04B 1/707
370/342
6,925,074 B1 8/2005 Vikberg et al. ............... 370/338
(Continued)

FOREIGN PATENT DOCUMENTS

CN 102474279 A 7/2009
CN 103119876 A 7/2010
(Continued)

OTHER PUBLICATIONS

International Search Report and Written Opinion of International Search Authority for PCT/CN2015/089239 dated Nov. 25, 2015 (11 pages).

(Continued)

*Primary Examiner* — Tuan H Nguyen
(74) *Attorney, Agent, or Firm* — Imperium Patent Works; Zheng Jin

(57) ABSTRACT

A method of fast link adaptation for Bluetooth long-range wireless networks is provided. A novel rate indication (RI) field is incorporated in a data packet to enable auto detection of rate adaptation at the receiver side. The data packet comprises a preamble, a first packet portion including the RI field, and a second packet portion including the PDU. The first packet portion is encoded with a first rate while the second packet portion is encoded with a second rate indicated by the RI field. The transmitting device raise/lower the encoding rate when the link quality is good/poor. The receiving device can provide recommended rate or link quality feedback information via an LMP message to help the transmitting device making rate adaptation decision. The (Continued)

transmitter can unilaterally decide the data rate for the second packet portion without receiver recommendation.

17 Claims, 4 Drawing Sheets

(51) Int. Cl.
*H04W 28/02* (2009.01)
*H04L 12/825* (2013.01)

(56) References Cited

U.S. PATENT DOCUMENTS

| | | | | |
|---|---|---|---|---|
| 2003/0053519 A1* | 3/2003 | Gilhousen | ............. | H04B 1/707 375/141 |
| 2010/0203838 A1* | 8/2010 | Ding | ................... | H04W 52/362 455/41.3 |
| 2010/0317289 A1 | 12/2010 | Desai et al. | ................. | 455/41.2 |
| 2011/0026578 A1* | 2/2011 | Chen | ................. | H04L 25/03159 375/232 |
| 2012/0008937 A1 | 1/2012 | Cheng et al. | ..................... | 398/1 |
| 2012/0052802 A1 | 3/2012 | Kasslin et al. | ............... | 455/41.2 |
| 2012/0178471 A1 | 7/2012 | Kainulainen et al. | ..... | 455/456.1 |
| 2012/0220351 A1 | 8/2012 | Kerai et al. | .................... | 455/574 |
| 2013/0215942 A1 | 8/2013 | Addepalli et al. | ............ | 375/224 |
| 2014/0064212 A1 | 3/2014 | Ko et al. | ....................... | 370/329 |

FOREIGN PATENT DOCUMENTS

| | | |
|---|---|---|
| CN | 102378365 A | 8/2010 |
| CN | 102625232 A | 1/2011 |
| WO | WO2014036955 A1 | 9/2012 |

OTHER PUBLICATIONS

International Search Report and Written Opinion of International Search Authority for PCT/US2015/054097 dated Jan. 7, 2016 (8 pages).

* cited by examiner

RATE INDICATION AND LINK ADAPTATION FOR LONG RANGE WIRELESS NETWORKS

CROSS REFERENCE TO RELATED APPLICATIONS

This application claims priority under 35 U.S.C. §119 from U.S. Provisional Application No. 62/047,706, entitled "Link Adaptation for Long Range," filed on Sep. 9, 2014; U.S. Provisional Application No. 62/052,519, entitled "Rate Indication and Link Adaptation for Long Range," filed on Sep. 19, 2014, the subject matter of which is incorporated herein by reference.

TECHNICAL FIELD

The disclosed embodiments relate generally to wireless network communications, and, more particularly, to rate indication and link adaptation for Low energy (LE) long range Bluetooth wireless networks.

BACKGROUND

Bluetooth is a wireless technology standard for exchanging data over short distances (using short-wavelength UHF radio waves in the ISM band) from fixed and mobile devices and building personal area networks (PANS). Bluetooth operates at frequencies between 2400 and 2483.5 MHz (including guard bands 2 MHz wide at the bottom end and 3.5 MHz wide at the top). This is in the globally unlicensed Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of one MHz. Bluetooth 4.0 uses 2 MHz spacing, which accommodates 40 channels. The first channel starts at 2402 MHz and continues up to 2480 MHz in 2 MHz steps. It usually performs 1600 hops per second, with Adaptive Frequency-Hopping (AFH) enabled.

Bluetooth low energy (Bluetooth LE, BLE) is a wireless personal area network technology designed and marked by the Bluetooth Special Interest Group aimed at novel applications in the healthcare, fitness, beacons, security, and home entertainment industries. Compared to Bluetooth, BLE is intended to provide considerably reduced power consumption and cost while maintaining a similar communication range. BLE uses frequency hopping to counteract narrowband interference problems. The LE system employs a frequency hopping transceiver to combat interference and fading and provides many frequency hopping spread spectrum (FHSS) carriers. FHSS is a method of transmitting radio signals by rapidly switching a carrier among many frequency channels.

The majority of channel signal to noise ratios (SNRs) vary within +/−5 dB. Without fast rate adaptation, the radio needs to operate at the lowest data rate or high SNR to maintain the PER. More than two data rates might be required for 10 dB SNR variations. In Bluetooth/BLE, Channel Quality Driven Data Rate Change (CQDDR) is a channel rate control algorithm implemented in Link management protocol (LMP) for rate adaptation. The signaling exchange of LMP messages relies on the underlying physical layer link, which might not work well in poor signal-to-noise ratio condition.

While short-range Bluetooth/BLE communication is between individual radios within a distance of 5 to 10 meters, long-range Bluetooth/BLE calls for a distance of about 100 meters or longer. The long-range channel characteristics is considerably different from the short-range channel characteristics. Long-range channels have lower operating SNR, frequency selective fading, and has faster time domain variations along the propagation path. The hopping channels may have significantly different SNRs because it is difficult to find hopping sequence/channel map satisfying all nodes within a Piconet. Longer packet length is also more susceptible to mid-packet collisions and requires trickier link management operation. If the link management is not robust, then long-range communication also results in higher power consumption due to re-transmission.

The existing LMP/CQDDR is a MAC layer protocol. The TX and RX radios use the PHY layer PDU to transmit LMP messages and need to establish handshake. Overall, LMP is a very slow adaptation process: the receiver MAC layer operation detects channel degradation usually after multiple packets, and then requests a preferred rate to the transmitter. If the physical link is nearly lost, or the ACK is not properly received, the radio can make a few retries until the LMP message is successfully acknowledged and the transmitter can switch to preferred rate after negotiation. If link is lost, both sides rely on timeout to try different PHY rates. In some cases, the PHY layer link might be broken and LMP messages cannot be reliably exchanged. Another drawback is that transmitter cannot unilaterally switch PHY data rate without message exchange with the receiver or after timeout. As a result, the existing LMP/CQDDR is difficult to adapt properly with varying SNRs at different channels, especially for long range Bluetooth or BLE communication. Further, the transmitter that purely relies on LMP message for link adaptation would not easily attempt high data rate since, if link is not reliably at higher rate, it would take a long time to recover.

A solution is sought to improve rate adaptation for long-range Bluetooth/BLE communication.

SUMMARY

A method of fast link adaptation for Bluetooth long-range wireless networks is provided. A novel rate indication (RI) field is incorporated in a data packet to enable auto detection of rate adaptation at the receiver side. The data packet comprises a preamble, a first packet portion including the RI field, and a second packet portion including the PDU. The first packet portion is encoded with a first rate while the second packet portion is encoded with a second rate indicated by the RI field. In a preferred embodiment, the first packet portion is encoded with an error correction code that terminates within the first portion. The second packet portion may or may not encoded with an error correction code.

In accordance with a novel aspect, the transmitting device raise/lower the encoding rate when the link quality is good/poor. The receiving device can provide recommended rate or link quality feedback information via a link management protocol (LMP) message to help the transmitting device making the rate adaptation decision. The transmitting device can also unilaterally decide the data rate for the second packet portion without the receiver recommendation. This is especially important if the link condition is poor and the transmitting device can attempt a lower data rate without waiting for a time-out. Additionally, the transmitting device can also start with a high data rate to speed up the data transfer and to save power consumption.

In one embodiment, a transmitting device indicates and adapts a data rate associated with a data packet to be transmitted to a receiving device in a wireless communication network. The data packet comprises a preamble, a first packet portion, and a second packet portion. The transmitting device encodes the first packet portion in accordance with a first rate. The first packet portion comprises a rate indication field. The transmitting device encodes the second packet portion in accordance with a second rate. The second rate is indicated based on a value of the rate indication field. In a preferred embodiment, the first packet portion is encoded with an error correction code that terminate within the first portion. The second packet portion may or may not be encoded with an error correction code. Finally, the transmitting device transmits the data packet to the receiving device in the wireless communication network. In one example, the transmitting device raises the second rate when detecting the link quality is good or in an attempt to speed up data transfer or conserve power. In another example, the transmitting device lowers the second rate when detecting the link quality is poor.

In another embodiment, a receiving device receives a data packet from a transmitting device in a wireless communication network. The data packet comprises a preamble, a first packet portion, and a second packet portion. In a preferred embodiment, the first packet portion is encoded with an error correction code that terminate within the first portion. The second packet portion may or may not be encoded with an error correction code. The receiving device decodes the first packet portion in accordance with a first rate. The first packet portion comprises a rate indication field. The receiving device decodes the second packet portion in accordance with a second rate. The second rate is indicated based on a value of the rate indication field. In one example, the receiving device provides feedback information to the transmitting device via an LMP message. In another example, the receiving device provides recommended information to the transmitting device via a rate indication field for fast feedback. The recommended information comprises a recommended rate or a transmit power adjustment.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
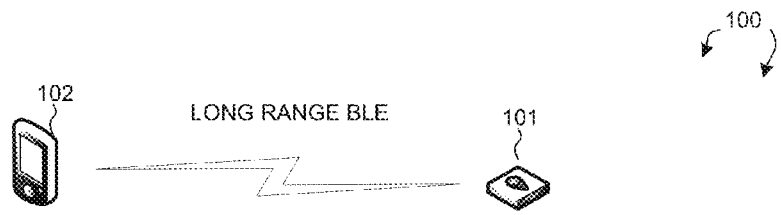
FIG. 1 illustrates a wireless communication network and a data packet with a rate indication field in accordance with one novel aspect.
Figure 1:
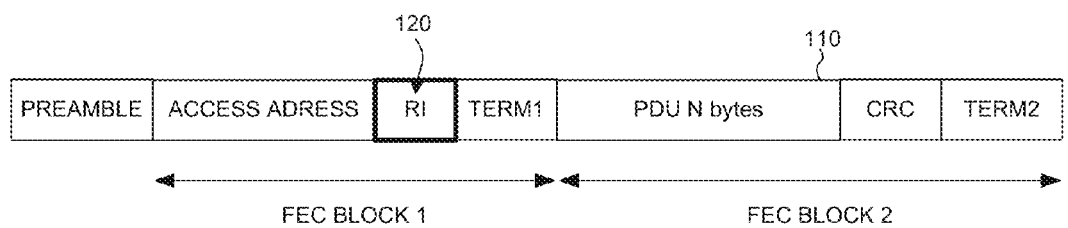

FIG. 1 illustrates a wireless communications network 100 and a data packet 110 with a rate indication (RI) field 120 in accordance with one novel aspect. Wireless communication network 100 comprises a wireless transmitting device 101 and a wireless receiving device 102. Wireless communication network 100 is a Bluetooth low energy (Bluetooth LE, BLE) network. Bluetooth LE applies a wireless personal area network technology designed and marked by the Bluetooth Special Interest Group. Compared to Bluetooth, BLE is intended to provide considerably reduced power consumption and cost while maintaining a similar communication range. BLE uses frequency hopping to counteract narrowband interference problems. The BLE system employs a frequency hopping transceiver to combat interference and fading and provides many frequency hopping spread spectrum (FHSS) carriers. FHSS is a method of transmitting radio signals by rapidly switching a carrier among many frequency channels.

In the example of FIG. 1, the distance between transmitting device 101 and receiving device 102 may be longer than 100 meters, resulting in a long-range BLE communication channel. The long-range BLE channel characteristics is considerably different from the short-range channel characteristics. Long-range channels have lower operating signal to noise ratio (SNR), frequency selective fading, and has faster time domain variations along the propagation path. The hopping channels may have significantly different SNRs because it is difficult to find hopping sequence/channel map satisfying all nodes within a Piconet. Longer packet length is also more susceptible to mid-packet collisions and requires trickier link management operation. If the link management protocol is not robust, then long-range communication also results in higher power consumption.

In principle, rate adaptation increases network throughput and reduces power consumption by reducing re-transmissions and reducing airtime. In Bluetooth/BLE, Channel Quality Driven Data Rate Change (CQDDR) is a channel rate control algorithm implemented in Link management protocol (LMP) for channel-to-channel rate adaptation. However, the existing LMP/CQDDR does not provide fast rate adaptation. It is a MAC layer protocol. The TX and RX radios use the same PHY rate to transmit LMP messages and need to establish handshake. Overall, LMP is a very slow adaptation process: the receiver detects channel degradation, receiver requests a preferred rate, and the transmitter switches to preferred rate after negotiation. MAC layer needs multiple packets to go through each of above step. In some cases, the PHY layer link might be nearly broken and LMP messages cannot be reliably exchanged. If the link is lost, both sides rely on timeout to try different PHY rates. As a result, the existing LMP/CQDDR is difficult to adapt properly with varying SNRs at different channels, especially for long range Bluetooth or BLE communication.

In accordance with one novel aspect, a novel rate indication (RI) field is incorporated in the data packet to enable auto detection of fast link adaptation at the receiver side. In wireless communications network 100, the wireless devices communicate with each other through various well-defined packet preamble structures. For example, the transmitting device 101 encodes and transmits a data packet 110. The receiving device 102 receives data packet 110 and tries to decode data packet 110. Data packet 110 comprises preamble, an access address field, a rate indication (RI) field 120, a first TERM1 field, a payload data Unit (PDU), CRC, and a second TERM2 field. The first three fields (access address, RI, and TERM1) form a first FEC block 1, while the next three fields (PDU, CRC, and TERM2) form a second FEC block 2. In one preferred embodiment, the second FEC block 2 might not be encoded with FEC.

The preamble is not coded and therefore transmitted and received at LE 1M. The preamble is 10 octets (80 bits) in length and consists of 10 repetitions of the 00111100b bit pattern. The FEC block 1 consists of three fields: the Access Address, RI, and TERM1. The Access Address is 32 bits. The RI field consists of two bits. In one example, a RI bit pattern of 00b indicates that the FEC Block 2 is coded at LE 125 k, and a RI bit pattern of 01b indicates that the FEC Block 2 is coded at LE 500 k. Note that the 2 bits in RI field can have four possible bit patterns. Only, two of the four possible bit patterns are used now. The remaining 2-bit patterns are for reserved for future use. TERM1 is 3 bits in length with the value of each bit set to zero. FEC block 1 is coded in accordance with a fixed rate, e.g., at 125 k. The FEC block 2 consists of three fields: the PDU, CRC, and TERM2. CRC is 24 bits in length and the value is calculated over all PDU bits. TERM2 is 3 bits in length with the value of each bit set to zero. FEC block 2 is coded in accordance with the rate indicated by the RI field. For example, if RI=00b, then the FEC block 2 is coded at LE 125 k. If RI=01b, then the FEC block 2 is coded at LE 500 k. Since the RI field indicates the coding rate, it is also referred to as a "coding indicator (CI)".

With the RI field, fast rate adaption can be achieved for long-range BLE. No handshaking or synchronization is required for data rate change. The transmitter can change the data rate on each individual channel unilaterally. Fast adaptation is feasible because the transmitter can make the decision directly based on channel quality, whether ACK is received or not, receiver status, or receiver recommendation, etc. Transmitter can simply use a trial and error approach. For example, transmitter can start with a high data rate to save power and speed up the data transfer and if no ACK, it immediately switches to low rate.

Figure 2:
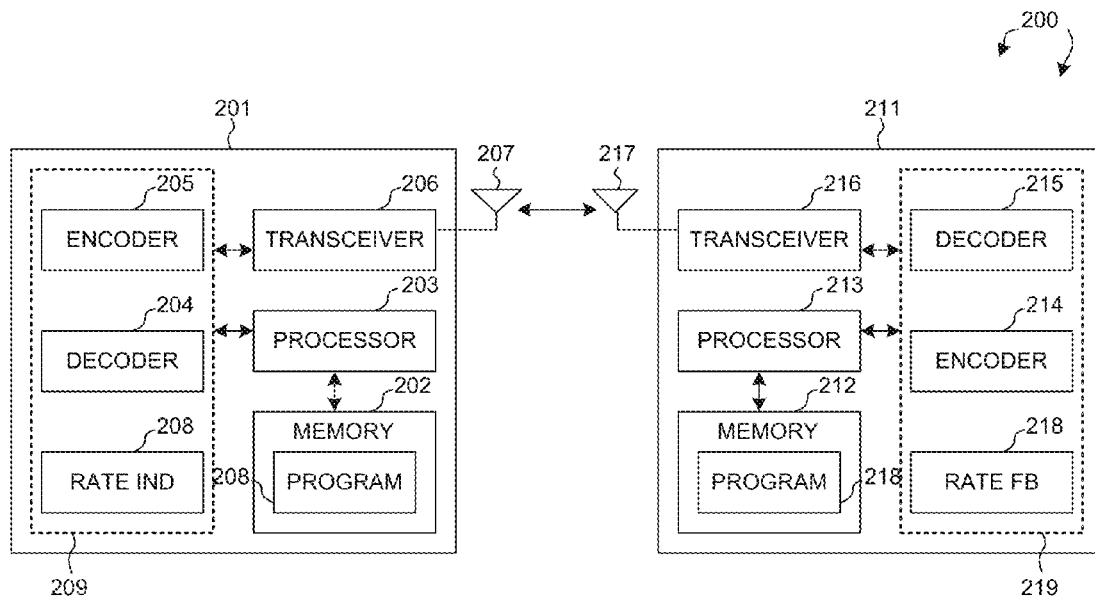
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several functional modules to carry out some embodiments of the present invention. The different functional modules are circuits can be configured and implemented by software, firmware, hardware, or any combination thereof. The function modules, when executed by the processors 203 and 213 (e.g., via executing program codes 208 and 218), for example, allow device 201 to encode and transmit a bit stream to device 211, and allow device 211 to receive and decode the bit stream accordingly. Link adaptation module 209/219 comprises encoder 205/215, decoder 204/214, and rate indication circuit 208 and/or rate feedback circuit 218. In one example, at the transmitter side, rate indication circuit 208 determines an adaptive symbol rate of a packet to be transmitted, encoder 205 inserts the RI field into a bit stream of the data packet and performs FEC encoding on the PDU of the data packet based on the symbol rate indicated by the RI field. At the receiver side, the decoder 215 examines the RI field and decodes the PDU of the data packet based on a symbol rate indicated by the RI field accordingly. The rate feedback circuit 218 may also recommend a preferred symbol rate of the receiver to the transmitter, or provide link quality feedback information to the transmitter.

Figure 3:
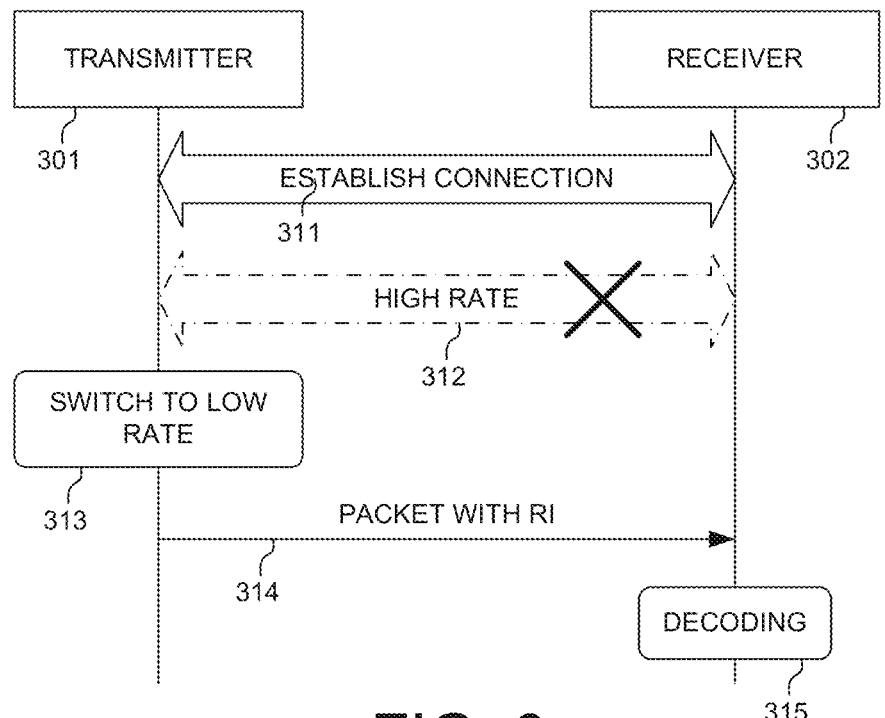
FIG. 3 illustrates one embodiment of rate indication for fast link adaptation in a Bluetooth long-range wireless network.

FIG. 3 illustrates one embodiment of rate indication for fast link adaptation in a Bluetooth long-range wireless network. In step 311, transmitter 301 and receiver 302 establish a connection for exchanging data packets. For power saving, the connection interval is in the order of hundreds of milliseconds. As a result, the same chancel is used for the same connection event and multiple packets are exchanged in the same channel. In the example of FIG. 3, in step 312, the transmitter and the receiver exchanges data packets at a high symbol rate, e.g., 500 k. However, the transmitter detects that the link quality is not good. For example, the transmitter receives NACK or does not receive ACK from the receiver. In step 313, the transmitter decides to switch to a lower symbol rate, e.g., 125 k for the next data packet. In step 314, the transmitter transmits a data packet with an RI field. The packet comprises a first FEC block and a second FEC block. The first FEC block comprises the RI field, while the second FEC block comprises the PDU. The RI field indicates that the second FEC block is encoded with a lower symbol rate of 125 k. In step 315, the receiver retrieves the RI field from the data packet and decodes the PDU based on the indicated symbol rate of 125 k.

Figure 4:
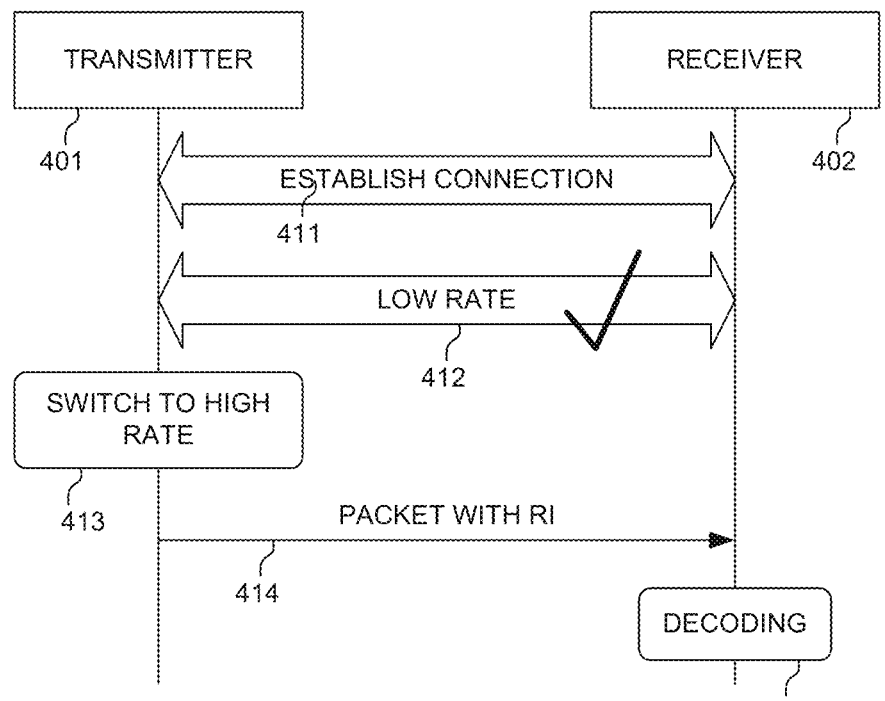
FIG. 4 illustrates another embodiment of rate indication for fast link adaptation in a Bluetooth long-range wireless network.

FIG. 4 illustrates another embodiment of rate indication for fast link adaptation in a Bluetooth long-range wireless network. In step 411, transmitter 401 and receiver 402 establish a connection for exchanging data packets. For power saving, the connection interval is in the order of hundreds of milliseconds. As a result, the same chancel is used for the same connection event and multiple packets are exchanged in the same channel. In the example of FIG. 4, in step 412, the transmitter and the receiver exchanges data packets at a low symbol rate, e.g., 125 k. However, the transmitter detects that the link quality is good. For example, the transmitter successfully receives ACK from the receiver and the SNR is above a threshold. In step 413, the transmitter decides to switch to a higher symbol rate, e.g., 500 k for the next data packet. In step 414, the transmitter transmits a data packet with an RI field. The packet comprises a first FEC block and a second FEC block. The first FEC block comprises the RI field, while the second FEC block comprises the PDU. The RI field indicates that the second FEC block is encoded with a higher symbol rate of 500 k. In step 415, the receiver retrieves the RI field from the data packet and decodes the PDU based on the indicated symbol rate of 500 k.

Figure 5:
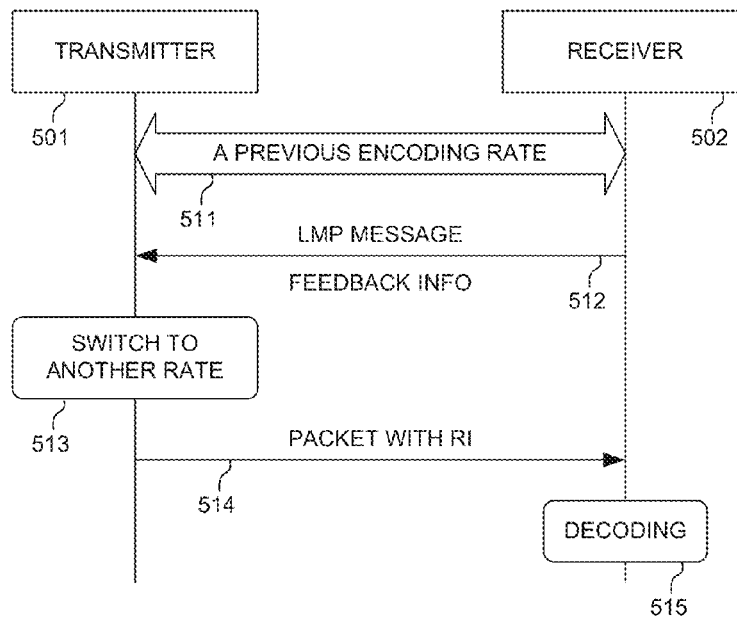
FIG. 5 illustrates one embodiment of fast link adaptation with recommendation or feedback from the receiving device.

FIG. 5 illustrates one embodiment of fast link adaptation with recommendation or feedback from the receiving device. In step 511, transmitter 501 and receiver 502 establish a connection and exchange data packets encoded with a previous rate. In step 512, the receiver sends an LMP (link management protocol) message to the transmitter with feedback information. For example, the receiver may provide a recommended data rate to the transmitter based on the receiver's own preference and the link quality. In another example, the receiver provides recommended information via the RI field for fast feedback. The recommended information comprises either a recommended data rate or a recommended TX power adjustment. The transmitter makes the final decision based on the feedback information. The present invention thus provides a novel way to combine the MAC layer LMP and the PHY layer RI in a coherent way. The two protocols work in harmony—e.g., any conflict between the MAC layer recommendation and the PHY layer RI is determined since the priority is given to the transmitter setting of the RI.

In step 513, the transmitter receives the LMP message and decides whether to adopt the recommended data rate or not. Note that the transmitter is the final decision maker here. There is no handshaking or negotiation involved. The receiver merely provides a recommendation. The transmitter makes the final decision of a new encoding rate for the next PDU and indicates the new encoding rate via the RI field. In step 514, the transmitter encodes the PDU of the data packet in accordance with the new rate and indicates the new rate via the RI field. In step 515, the receiver retrieves the RI field from the data packet and decodes the PDU of the data packet based on the new rate.

Figure 6:
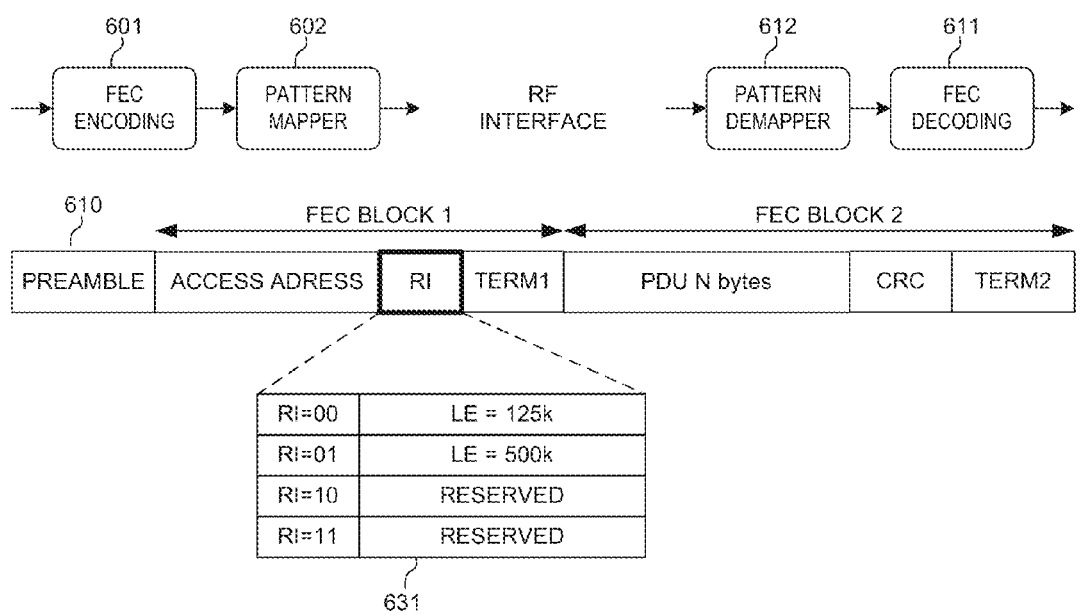
FIG. 6 illustrates FEC encoding and an example of the rate indication (RI) field of a data packet in accordance with one novel aspect.

FIG. 6 illustrates FEC encoding and examples of the rate indication (RI) field of a data packet in accordance with one novel aspect. As illustrated in FIG. 6, data packet 610 (except for the preamble part) is first coded by the convolutional forward error correction (FEC) encoder 601, and then spread by the inner pattern mapper 602 before transmission. At the receiver side, the received bit stream is de-mapped by pattern de-mapper 612, and then decoded by FEC decoder 611. Note that the RI field in FEC block 1 is also convolutional FEC encoded, with a fixed low rate of 125 k. Therefore, RI is protected even at lower SNR. On the other hand, the PDU in FEC block 2 is FEC encoded with an adaptive rate indicated by RI. The transmitter is able to quickly decide an appropriate rate that is adaptive to the link quality. As a result, network throughput is improved.

FIG. 6 also illustrates an example of the RI field. In the example depicted by table 631, RI has two bits. RI=x0b indicates a data rate of 125 kbps (coded), RI=x1b indicates a data rate of 500 kbps (un-coded), where the MSB bit is reserved for future use. Since RI indicates the coding rate, it is also referred to as a "coding indicator (CI). It is possible to use the reserved bit rule to allow a receiver to feedback a rate recommendation to transmitter side. A preferred embodiment can be to use the MSB to indicate a) switch rate if set to "1", and b) retain the current rate if set to "0" or vice versa. In this embodiment, the receiver can make "fast recommendation or feedback" via the reserved RI bit. The receiver recommends to switch to a different rate than the previously transmitted PDU or to retain the same rate subject to adaptation rules and the link condition. Note that the transmitter can always change rate on its own by setting the LSB of the RI filed. In another alternative embodiment, the MSB of the RI is used to indicate a) to increase TX power if set to "1", and b) to decrease TX power if set to "0" or vice versa. As a result, the receiver can make recommendation on data rate as well as TX power adjustment.

Figure 7:
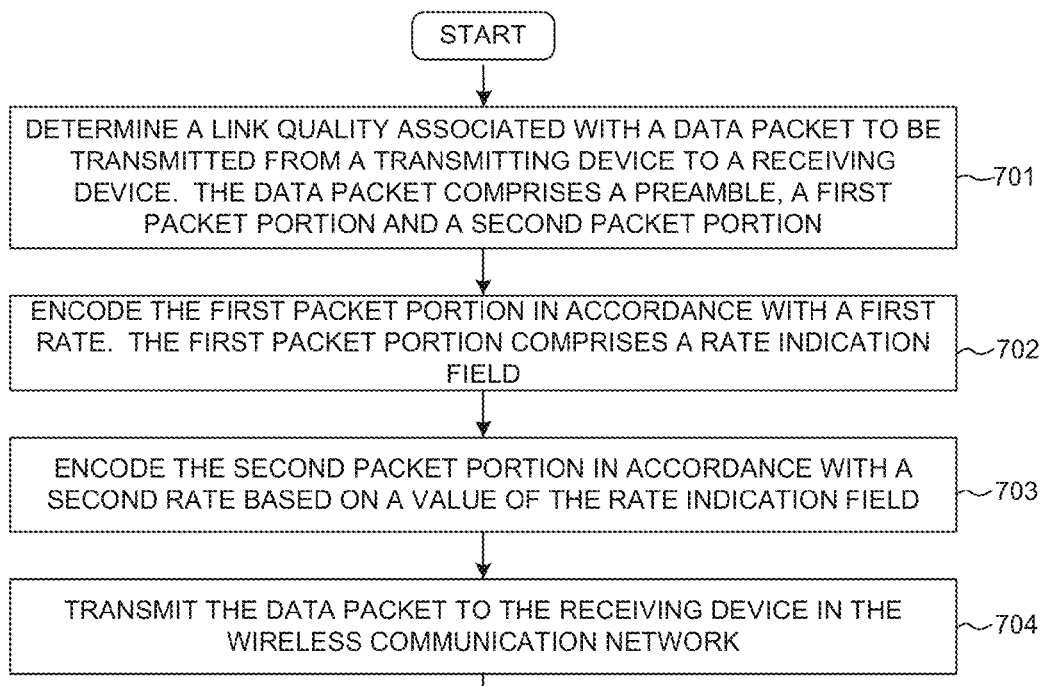
FIG. 7 is flow chart of a method of rate indication from transmitter perspective in accordance with a novel aspect.

FIG. 7 is flow chart of a method of rate indication for link adaptation from transmitter perspective in accordance with a novel aspect. In step 701, a transmitting device indicates and adapts a data rate associated with a data packet to be transmitted to a receiving device in a wireless communication network. The data packet comprises a preamble, a first packet portion, and a second packet portion. In step 702, the transmitting device encodes the first packet portion in accordance with a first rate. The first packet portion comprises a rate indication field. In step 703, the transmitting device encodes the second packet portion in accordance with a second rate. The second rate is indicated based on a value of the rate indication field. In step 704, the transmitting device transmits the data packet to the receiving device in the wireless communication network. In one example, the transmitting device raises the second rate when detecting the link quality is good. In another example, the transmitting device lowers the second rate when detecting the link quality is poor.

Figure 8:
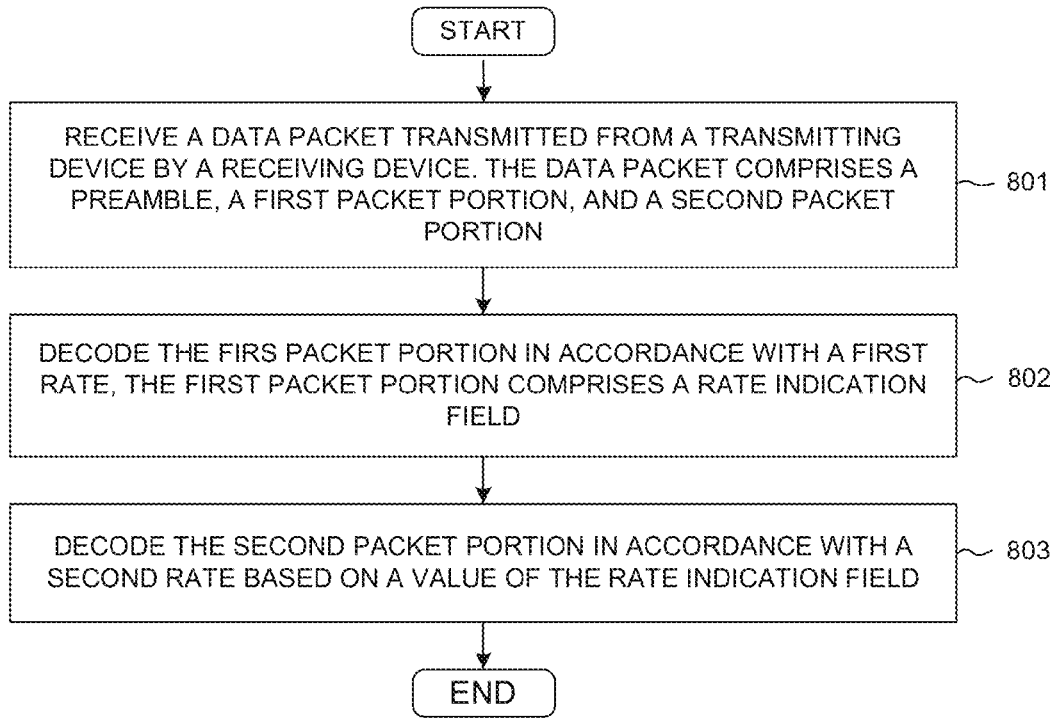
FIG. 8 is a flow chart of a method of rate indication from receiver perspective in accordance with a novel aspect.

FIG. 8 is a flow chart of a method of rate indication for link adaptation from receiver perspective in accordance with a novel aspect. In step 801, a receiving device receives a data packet from a transmitting device in a wireless communication network. The data packet comprises a preamble, a first packet portion, and a second packet portion. In step 802, the receiving device decodes the first packet portion in accordance with a first rate. The first packet portion comprises a rate indication field. In step 803, the receiving device decodes the second packet portion in accordance with a second rate. The second rate is indicated based on a value of the rate indication field. In one example, the receiving device provides feedback information to the transmitting device via an LMP message. In another example, the receiving device provides recommended information to the transmitting device via a rate indication field for fast feedback. The recommended information comprises a recommended rate or a transmit power adjustment.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
  indicating and adapting a data rate associated with a data packet to be transmitted from a transmitting device to a receiving device in a wireless communication network, wherein the data packet comprises a preamble, a first packet portion, and a second packet portion;
  encoding the first packet portion in accordance with a first rate, wherein the first packet portion comprises an access address field and a rate indication field, wherein the access address field and the rate indication field are convolutional forward error correction (FEC) encoded with a predetermined rate;
  encoding the second packet portion in accordance with a second rate based on a value of the rate indication field; and transmitting the data packet to the receiving device in the wireless communications network.

2. The method of claim 1, wherein the transmitting device decides and transmits the data packet at the data rate based on pre-determined rules.

3. The method of claim 2, where transmitting device decides the data rate unilaterally without negotiating with the receiving device and without waiting for a timeout of data transmission.

4. The method of claim 1, further comprising:
receiving feedback information carried by a link management protocol (LMP) message from the receiving device and thereby determining the second rate.

5. The method of claim 1, further comprising:
receiving recommended information from the receiving device through a rate indication field, wherein the recommended information comprises a recommended rate or a transmit power adjustment.

6. The method of claim 1, wherein the wireless communication network is a Bluetooth long-range wireless network.

7. A wireless device comprising:
a rate indication circuit that is configured to indicate and adapt a data rate associated with a data packet to be transmitted to a receiving device in a wireless communication network, wherein the data packet comprises a preamble, a first packet portion, and a second packet portion;
an encoder that encodes the first packet portion in accordance with a first rate, wherein the first packet portion comprises an access address field and a rate indication field, wherein the access address field and the rate indication field are convolutional forward error correction (FEC) encoded with a predetermined rate, wherein the encoder also encodes the second packet portion in accordance with a second rate based on a value of the rate indication field; and
an RF transmitter that transmits the data packet to the receiving device in the wireless communications network.

8. The device of claim 7, wherein the device decides and transmits the data packet at the data rate based on pre-determined rules.

9. The device of claim 8, where device decides the data rate unilaterally without negotiating with the receiving device and without waiting for a timeout of data transmission.

10. The device of claim 7, wherein the device receives feedback information carried by a link management protocol (LMP) message from the receiving device and thereby determining the second rate.

11. The device of claim 10, wherein the device receives recommended information from the receiving device through a rate indication field, and wherein the recommended information comprises a recommended rate or a transmit power adjustment.

12. The device of claim 7, wherein the wireless communication network is a Bluetooth long-range wireless network.

13. A method comprising:
receiving a data packet from a transmitting device by a receiving device in a wireless communication network, wherein the data packet comprises a preamble, a first packet portion, and a second packet portion;
decoding the first packet portion in accordance with a first rate, wherein the first packet portion comprises an access address field and a rate indication field, wherein the access address field and the rate indication field are convolutional forward error correction (FEC) encoded with a predetermined rate; and
decoding the second packet portion in accordance with a second rate based on a value of the rate indication field.

14. The method of claim 13, wherein the receiver automatically detects the data rate of the data packet from the rate indication field.

15. The method of claim 13, further comprising:
transmitting feedback information carried by a link management protocol (LMP) message to the transmitting device.

16. The method of claim 13, further comprising:
transmitting recommended information through a rate indication field to the transmitting device, wherein the recommended information comprises a recommended rate or a transmit power adjustment.

17. The method of claim 13, wherein the wireless communication network is a Bluetooth long-range wireless network.

* * * * *